(12) United States Patent  
Huffman

(10) Patent No.: US 7,406,554 B1  
(45) Date of Patent: Jul. 29, 2008

(54) QUEUE CIRCUIT AND METHOD FOR MEMORY ARBITRATION EMPLOYING SAME

(75) Inventor: William A. Huffman, Los Gatos, CA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 694 days.

(21) Appl. No.: 09/909,704

(22) Filed: Jul. 20, 2001

Related U.S. Application Data

(60) Provisional application No. 60/219,939, filed on Jul. 20, 2000.

(51) Int. Cl.
G06F 13/16 (2006.01)
G06F 12/00 (2006.01)

(52) U.S. Cl. ...................... 710/112; 711/151

(58) Field of Classification Search ............. 710/107, 710/113, 52, 29, 112, 117, 243; 711/137, 711/141, 151, 152, 154, 112, 144, 158; 712/217; 370/412, 235, 416; 379/266.01; 707/104.1
See application file for complete search history.

(56) References Cited

U.S. PATENT DOCUMENTS

| | | | |
|---|---|---|---|
| 5,293,493 A | 3/1994 | Smith et al. | |
| 5,349,690 A * | 9/1994 | Frame et al. | 710/107 |
| 5,375,223 A * | 12/1994 | Meyers et al. | 711/151 |
| 5,432,918 A * | 7/1995 | Stamm | 711/156 |
| 5,621,898 A * | 4/1997 | Wooten | 710/117 |
| 5,632,025 A * | 5/1997 | Bratt et al. | 711/152 |
| 6,003,101 A * | 12/1999 | Williams | 710/112 |
| 6,073,199 A * | 6/2000 | Cohen et al. | 710/113 |
| 6,108,307 A * | 8/2000 | McConnell et al. | 370/235 |
| 6,141,713 A * | 10/2000 | Kang | 710/107 |
| 6,145,061 A * | 11/2000 | Garcia et al. | 711/154 |
| 6,160,812 A * | 12/2000 | Bauman et al. | 370/416 |
| 6,185,672 B1 * | 2/2001 | Trull | 712/217 |
| 6,259,786 B1 * | 7/2001 | Gisby | 379/266.01 |
| 6,286,083 B1 | 9/2001 | Chin et al. | |
| 6,378,036 B2 * | 4/2002 | Lerman et al. | 711/112 |
| 6,425,060 B1 | 7/2002 | Mounes-Toussi et al. | |
| 6,430,191 B1 * | 8/2002 | Klausmeier et al. | 370/412 |
| 6,430,658 B1 | 8/2002 | Nunez et al. | |
| 6,438,135 B1 * | 8/2002 | Tzeng | 370/412 |
| 6,442,568 B1 * | 8/2002 | Velasco et al. | 707/104.1 |
| 6,449,671 B1 * | 9/2002 | Patkar et al. | 710/107 |
| 6,484,239 B1 * | 11/2002 | Hill et al. | 711/137 |
| 6,499,077 B1 * | 12/2002 | Abramson et al. | 710/305 |
| 6,542,987 B1 * | 4/2003 | Fischer et al. | 712/217 |
| 6,557,053 B1 * | 4/2003 | Bass et al. | 710/29 |
| 6,631,447 B1 * | 10/2003 | Morioka et al. | 711/141 |
| 6,694,388 B1 * | 2/2004 | Schzukin et al. | 710/52 |

* cited by examiner

*Primary Examiner*—Mark Rinehart
*Assistant Examiner*—Trisha Vu
(74) *Attorney, Agent, or Firm*—Baker Botts L.L.P.

(57) ABSTRACT

A memory access arbitration scheme is provided where transactions to a shared memory are stored in an arbitration queue. A collapsible queuing structure and method are provided, such that once a transaction is serviced, higher order entries ripple down in the queue to make room for new entries while maintaining an oldest to newest relationship among the queue entries. A queuing circuit having a plurality of registers interconnected by 2:1 multiplexers is also provided. The circuit is arranged such that each register receives either its own current contents or the contents of a higher order register during each register write cycle.

15 Claims, 3 Drawing Sheets

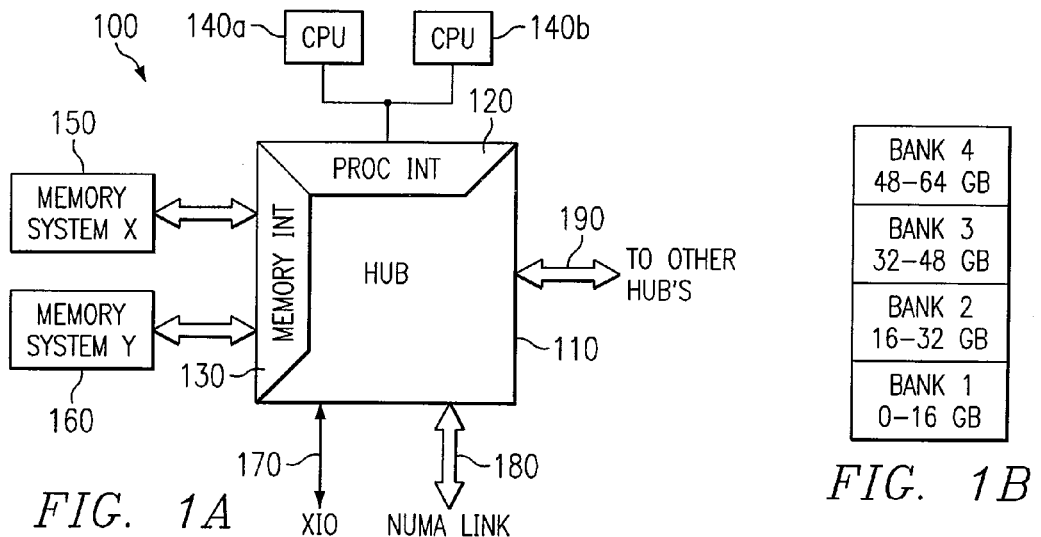
FIG. 1A
FIG. 1B
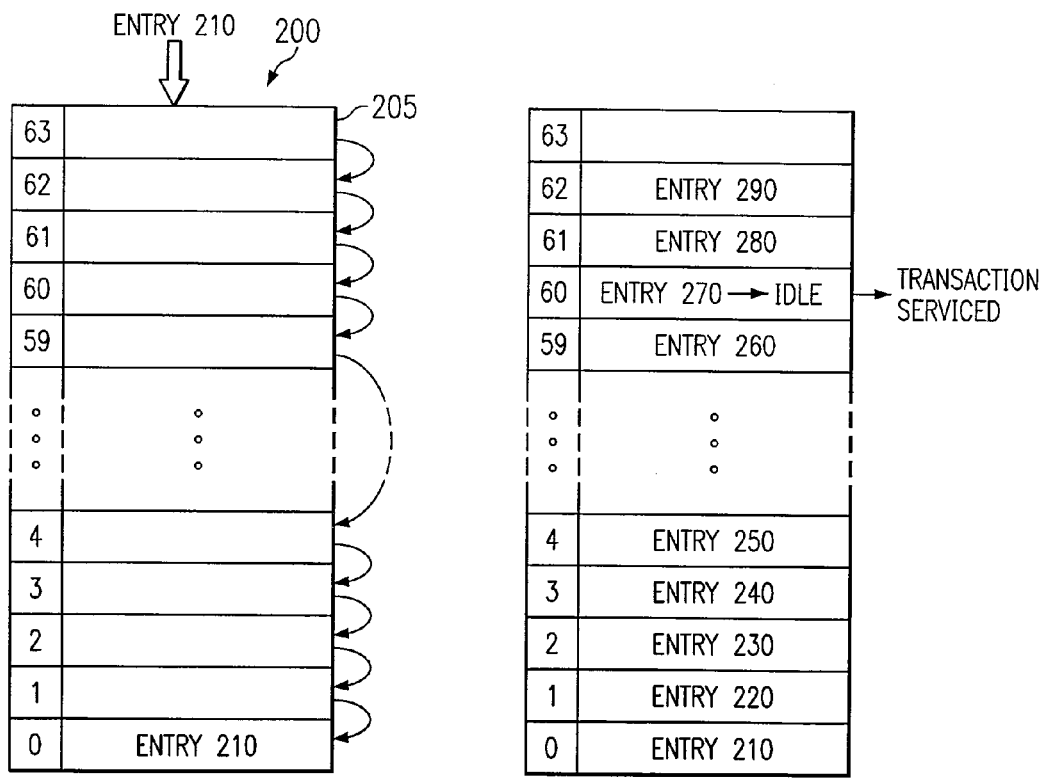
FIG. 2A
FIG. 2B

FIG. 6

| READ | WRITE | URGENT WRITE | FOLLOWS READ | FOLLOWS WRITE | DIRECTION THRESHOLD | ARBITRATE FOR |
|---|---|---|---|---|---|---|
| X | 0 | 0 | X | X | X | READ |
| 0 | X | 1 | X | X | X | WRITE |
| 0 | 1 | 0 | 1 | 0 | X | READ |
| 0 | 1 | 0 | 0 | X | X | WRITE |
| 1 | 1 | 0 | X | 0 | X | READ |
| 1 | 1 | 0 | 0 | 1 | 0 | WRITE |
| 1 | 1 | 0 | 0 | 1 | 1 | READ |
| 1 | X | 1 | 0 | X | X | WRITE |
| 1 | X | 1 | 1 | 0 | 0 | READ |
| 1 | X | 1 | 1 | 0 | 1 | WRITE |

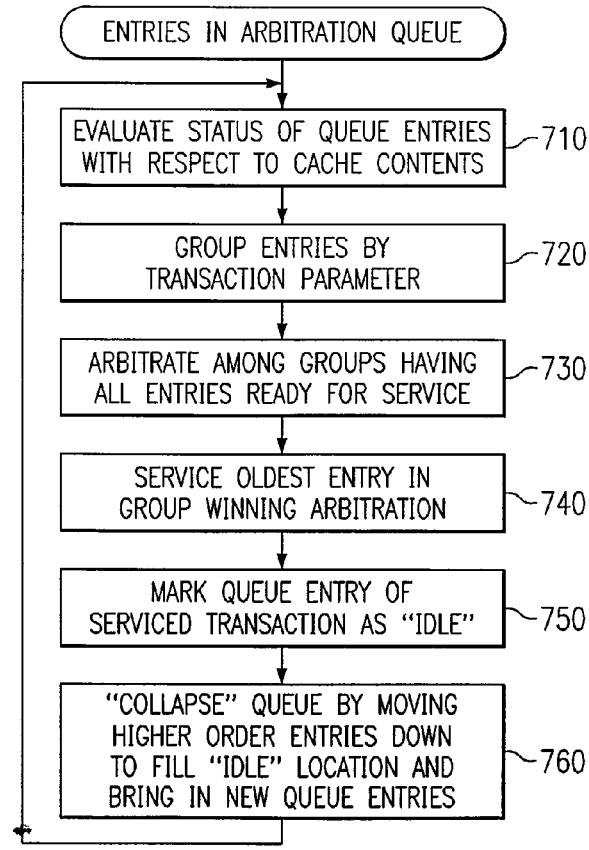

FIG. 7

ENTRIES IN ARBITRATION QUEUE
↓
EVALUATE STATUS OF QUEUE ENTRIES WITH RESPECT TO CACHE CONTENTS — 710
↓
GROUP ENTRIES BY TRANSACTION PARAMETER — 720
↓
ARBITRATE AMONG GROUPS HAVING ALL ENTRIES READY FOR SERVICE — 730
↓
SERVICE OLDEST ENTRY IN GROUP WINNING ARBITRATION — 740
↓
MARK QUEUE ENTRY OF SERVICED TRANSACTION AS "IDLE" — 750
↓
"COLLAPSE" QUEUE BY MOVING HIGHER ORDER ENTRIES DOWN TO FILL "IDLE" LOCATION AND BRING IN NEW QUEUE ENTRIES — 760

QUEUE CIRCUIT AND METHOD FOR MEMORY ARBITRATION EMPLOYING SAME

RELATED APPLICATIONS

This application claims the benefit of U.S. Provisional Application Ser. No. 60/219,939 filed Jul. 20, 2000.

FIELD OF THE INVENTION

The present invention relates generally to shared memory computer systems and more particularly relates to systems and methods for performing memory access arbitration among transactions in an arbitration queue.

BACKGROUND OF THE INVENTION

Multiprocessor computer architectures are known in the art and are recognized as overcoming limitations of single processor systems in terms of processing speed and transaction throughput. Typically, such multiprocessor systems are "shared memory" systems where multiple processors on a bus, or a number of busses, share a single global memory. In some shared memory multiprocessor systems, memory is uniformly accessible to each processor, which simplifies the task of dynamic load distribution. Processing of complex tasks can then be distributed among various processors in the multiprocessor system while data used in the processing is substantially equally available to each of the processors undertaking any portion of the complex task. Similarly, programmers writing code for typical shared memory systems do not need to be concerned with issues of data partitioning, as each of the processors has access to and shares the same, consistent global memory.

Many multi-processor systems suffer disadvantages in that system bandwidth and scalability are limited. Although multiprocessor systems may be capable of executing many millions of instructions per second, the shared memory resources and the system bus connecting the multiprocessors to the memory presents a bottleneck as complex processing loads are spread among more processors, each needing access to the global memory. As more processors are added to a system to perform complex tasks, the demand for memory access also increases. However, at some point, adding more processors does not necessarily translate into faster processing, i.e., typical systems are not fully scalable. The decrease in performance is generally due to the bottleneck created by the increased number of processors needing access to the memory and the transport mechanism, e.g. bus, to and from memory.

Alternative architectures are known which seek to relieve such bandwidth constraints. Computer architectures based on Cache Coherent Non-Uniform Memory Access (CCNUMA) are known in the art. CCNUMA architectures are typically characterized as having distributed global memory. Generally, CCNUMA machines include a number of processing nodes which are connected through a high bandwidth, low latency interconnection network. The processing nodes will generally include one or more high-performance processors, associated cache, and a portion of a global shared memory. Cache coherence, i.e., the consistency and integrity of shared data stored in multiple caches, is typically maintained by a directory-based, write-invalidate cache coherency protocol, as known in the art. To determine the status of caches, each processing node typically has a directory memory corresponding to its respective portion of the shared physical memory. For each line or discrete addressable block of memory, the directory memory stores an indication of remote nodes that are caching that same line.

One known implementation of the CCNUMA architecture is known as "DASH" (Directory Architecture for Shared memory), developed at the Computer Systems Laboratory at Stanford University. The DASH architecture, described in the Directory-Based Cache Coherence Protocol for the DASH Multiprocessor, Lenoski et al., Proceedings of the 14th Int'l Symp. Computer Architecture, IEEE CS Press, 1990, pp. 148-159, which is incorporated herein by reference, consists of a number of processing nodes connected through a high-bandwidth, low-latency interconnection network. As is typical in CCNUMA machines, the physical memory is distributed among the nodes of the multiprocessor, with all memory accessible to each node. Each processing node consists of: a small number of high-performance processors; their respective individual caches; a portion of the shared-memory; a common cache for pending remote accesses; and a directory controller interfacing the node to the network.

The DASH system places a significant burden relating to memory consistency on the software developed for the system. In effecting memory consistency in the DASH implementation of CCNUMA architecture, a "release consistency" model is implemented, which is characterized in that memory operations issued by a given processor are allowed to be observed and completed out of order with respect to other processors. Ordering of memory operations is only effected under limited circumstances. Protection of variables in memory is left to the programmer developing software for the DASH multiprocessor, as under the DASH release consistency model the hardware only ensures that memory operations are completed prior to releasing a lock on the pertinent memory. Accordingly, the release consistency model for memory consistency in DASH is a weakly ordered model. It is generally accepted that the DASH model for implementing memory correctness significantly complicates programming and cache coherency.

A problem in multi-processor, shared memory systems is that memory access among the multiple processors must be controlled in a manner such that data read from and written to memory does not become corrupted or incoherent. Because the multiple processors may seek to perform conflicting operations on memory locations, such as simultaneously read from and write to a particular location, it is imperative that a memory management scheme be employed. Memory arbitration schemes for performing such memory and cache management are known. For example, a basic arbitration scheme may simply involve a first in-first out (FIFO) buffer which manages memory access by always giving priority to the oldest entry in the buffer.

While a FIFO scheme is effective at avoiding memory conflicts, it does have attendant disadvantages. For example, the type of operation in the respective buffer entries is not given any weight in this arbitration scheme. As a result, it is possible to have alternating read and write requests throughout the buffer which, as they are serviced in turn, require the memory bus to be frequently "turned around" (changed from read to write) which is a time consuming and inefficient operation. Another disadvantage is that if the resource required to service the oldest entry in the buffer is unavailable during the current cycle, all other operations must still wait there turn in the FIFO buffer even if all conditions to perform their respective operations are satisfied. Thus, system latency increases in such a system.

Accordingly, as processors become faster and multiprocessor shared memory systems become more complex, there is a growing need for improved systems and methods for memory management including new arbitration schemes and circuits.

SUMMARY OF THE INVENTION

It is an object of the invention to provide a system for management of distributed shared memory which provide enhanced performance with respect to system bandwidth and latency.

It is a further object of the present invention to provide a memory arbitration scheme which reduces memory bus turn around while not adversely effecting system latency.

It is yet another object of the present invention to provide an arbitration queue where entries can be serviced from any point in the queue and that higher order entries ripple down to fill the voids in the queue created by previously serviced entries.

In accordance with the present method of memory arbitration in a system including shared system memory, cache memory and at least one processor submitting transactions to the system memory, the arbitration process includes placing memory transactions in entries in an arbitration queue. The status of the entries with respect to the cache is determined prior to selecting a transaction to be serviced from the queue. Entries are then selected to participate in arbitration based at least in part upon the cache status. For example, if the transaction status is invalid, that transaction cannot be serviced until a write back from cache to system memory is complete. If the status indicates a cache hit, that entry can participate in arbitration and, if selected, can be serviced from cache.

In accordance with another aspect of the present method of memory arbitration, before conducting arbitration the entries in the arbitration queue are grouped according to at least one transaction parameter. Arbitration can then proceed among the groups to select one group of entries for servicing. From the selected group, transactions are preferably serviced from oldest to newest. Preferably, the transaction parameters are selected to optimize bandwidth and latency. Parameters can include memory bank, write to bank, read from bank, read, write and the like.

In the present arbitration methods, transactions can be serviced from any location in the arbitration queue. As a result, openings at intermediate positions in the queue can occur. To efficiently utilize the full capacity of the queue, a collapsible queue arrangement can be used.

In accordance with one embodiment of a collapsible arbitration queue, a number of registers corresponding to the number of entries in the queue are employed. A plurality of 2:1 multiplexers are interposed between the registers such that one multiplexer is interposed between a higher order register and a subsequent register with the output of the higher order register being coupled to a first input of the one multiplexer and the output of the subsequent register being coupled to a second input of the one multiplexer. An output of the one multiplexer is coupled to the subsequent register and a Mux control line is coupled to the one multiplexer to direct the contents of one of the first and second multiplexer inputs to the multiplexer output. In this way, the multiplexer select line associated with the higher order register and subsequent register determines whether the subsequent register is refreshed with its current contents or receives the contents of the higher order register.

These and other objects and features of the invention will become apparent from the detailed description of preferred embodiments in conjunction with the accompanying drawings.

BRIEF DESCRIPTION OF THE DRAWINGS

For a more complete understanding of the present invention, reference is made to the detailed description taken in connection with the accompanying drawings, in which:

FIG. 1A is a block diagram of a portion of a multiprocessor computer system having shared memory;

FIG. 1B is a block diagram further illustrating an exemplary arrangement of the X and Y memory systems depicted in FIG. 1A;

FIGS. 2A-2C are pictorial diagrams illustrating an arbitration queue arrangement for use in the present memory management and arbitration systems and methods;

FIG. 6 is a table illustrating an exemplary DRAM direction arbitration policy table; and FIG. 7 is a flow chart illustrating an overview of an exemplary arbitration cycle in accordance with the present memory management methods.

DETAILED DESCRIPTION OF THE PREFERRED EMBODIMENTS

Figure 2C:
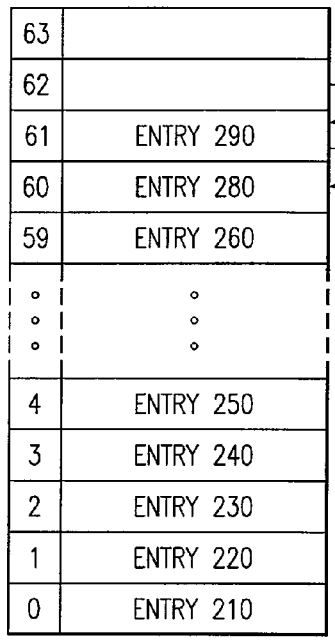

FIG. 1A is a block diagram of a portion of an exemplary multi-processor, distributed shared memory computer system architecture. The system 100 includes a hub 110 which has a processor interface circuit 120 and a memory/directory interface circuit 130. The system further includes two processors (CPU) 140a, 140b which are coupled to the hub 110 via the processor interface circuit 120. Also provided are a memory system X 150, and memory system Y 160 which are coupled to the hub 110 and are accessible by the processors 140a, 140b via the memory interface 130. Preferably, the memory systems are formed with high speed DRAM.

Preferably, the memory interface 130 includes, or has access to, cache memory. The use of cache in servicing memory transactions from the processors 140a, 140b (and others (not shown) in large, multi-processor arrangements) significantly improves the system bandwidth and overall processing efficiency. The term transaction is broadly used to include any and all accesses to system memory, including but not limited to reads, writes, write backs from cache and the like. The size and arrangement of the cache can take on any known arrangement which is compatible with the X memory system 150 and Y memory system 160. In an exemplary embodiment, the cache is formed as a 32 Kilobyte write back cache which has 1024 (1K) cache lines which can hold 8096 (8K) entries, where each line fills 32 bytes. The cache is 8 way associative with a seven bit index. The seven bit index is added to the three bits for directory (8 lines per entry) and 7 bits for cache data which results in 17 bits. In a 36 bit memory address system, there are 19 bits remaining for a tag.

The exemplary cache can be built as a 128 word by 160 bit REGISTER file. Three bits of Most Recently Used way number are appended to the 160 Bits to make a total of 163 bits in width, which can be split if desired. When a tag is checked, all 160 bits are read and are compared in eight separate comparators to the value being checked. If one of the tags matches, another entry is not made so as to avoid having two matching entries.

Generally, the hub 110 also includes various interface ports such as an X I/O port 170, a Non-Uniform Memory Access (NUMA) link 180 and a port for interconnection to other hubs 190, which can take the form of an X I/O port, a NUMA port or other interface port.

FIG. 1B further illustrates the arrangement of the X and Y memory systems. The memory is generally organized in a number of banks which can be independently accessed by the memory interface 130. For example, in FIG. 1B an arrangement is illustrated where 64 Gigabytes of DRAM memory is partitioned as four 16 Gigabyte banks. The memory address requires 36 bits in this case, with two of the bits, such as bits 35:34, operating as a bank select and the remaining bits (33:0) addressing the individual locations within each bank. In this arrangement, even if one bank is busy servicing a memory request, the remaining banks remain available for a contemporaneous service request.

The present memory arbitration system employs what is referred to herein as a collapsible arbitration queue 200 which is illustrated in the schematic diagrams of FIGS. 2A-C and 3. The arbitration queue 200 is formed with a number of interconnected registers which maintains an oldest to newest relationship among queue entries without operating in a strict FIFO manner. Referring to FIG. 2A, an exemplary arbitration queue structure is illustrated having sixty-four (64) entry registers 205 (0-63). Upon initialization, the arbitration queue is cleared such that each register is in an "idle" state. The idle state indicates that the register is available to be written into. When a memory transaction entry arrives from a processor, the entry 210 enters the arbitration queue 200 at the highest order register, in this case, register no. 63. Initially, each lower order queue entry, e.g. 0-62, is in the idle state. As a result, entry 210 advances one register location in the queue during each arbitration cycle until it is either serviced or reaches the bottom of the queue at register 0. New memory transaction entries arriving after entry 210 advance in the queue in a like manner until the queue is full.

The transactions in the queue can win arbitration and be serviced from any queue register location. The arbitration queue 200 is considered "collapsible" in that when a particular entry wins arbitration and is serviced, the state of that location in the queue is changed to the idle state and in the next cycle all higher entries in the queue 200 ripple down, thereby increasing in priority.

FIG. 2B illustrates the arbitration queue 200 when the arbitration queue 200 has a number of entries 210-290. Entry 270, which is located at an intermediate queue position, i.e. location 60, wins arbitration and is serviced. In this case, location 60 in the queue 200 is placed in the idle state. As illustrated in FIG. 2C, during the cycle following the servicing of entry 270, entries 280 and 290 are advanced in the queue from locations 62, 61 to locations 61, 60 respectively, thus collapsing the queue. If queue register location 63 contained an entry prior to this cycle, that entry would also advance thereby making register 63 available for the receipt of a new transaction to the queue. Thus, while any queue entry may be serviced based on a successful arbitration, the remaining entries, while advancing in priority, maintain an oldest to newest relationship.

Figure 3:
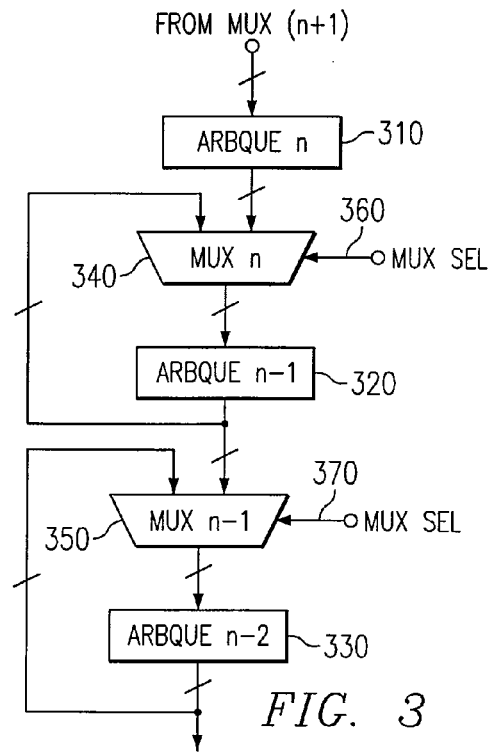
FIG. 3 is a simplified schematic diagram illustrating a portion of a collapsible queue structure for use in the present memory management and arbitration systems and methods.

FIG. 3 is a simplified schematic diagram of a portion of the arbitration queue 200 which illustrates the manner in which the collapsible queue feature can be implemented. The diagram illustrates three of the 64 registers which were used in the exemplary queue structure of FIGS. 2A-C. The registers 310, 320 and 330 are cascaded with 2:1 multiplexers 340, 350 interposed there between. The output of register 310 is coupled to a first input of multiplexer 340 and the output of multiplexer 340 is coupled to the input of register 320. The output of register 320 is coupled to a second input of multiplexer 340. A multiplexer (Mux.) select line 360 controls the multiplexer 340 and this signal determines whether register 320 will be refreshed with its own current contents (no change) or if register 320 will be loaded with the contents of the preceding higher order register 310. When register 320, or a lower order register, such as register 330, is in the idle state, the memory interface 130 or other appropriate controller sets the Mux select line 360 such that the contents of the higher order registers (with respect to the lower order register in the idle state) are written into the lower order registers during the next cycle.

As noted in connection with FIGS. 2 A-C and FIG. 3, entries can win arbitration and be serviced from any location in the queue. In order to facilitate the efficient arbitration and servicing of entries in the arbitration queue 200, the present memory management system performs two operations. First, prior to arbitration, the status of the transactions in the arbitration queue with respect to the cache (e.g., hit, miss, victim) are monitored and updated. Second, rather than performing arbitration strictly from oldest to newest among various transaction types, the transactions are grouped in accordance with a transaction parameter. Arbitration then takes place among these groups and from the selected group, transactions are serviced from oldest to newest.

Figure 4:
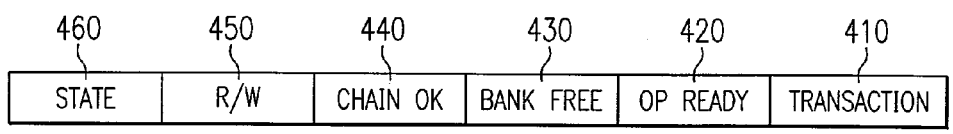
FIG. 4 is a pictorial diagram illustrating exemplary fields in the arbitration queue entries of FIGS. 2A-2C.

FIG. 4 is a schematic diagram which serves to illustrate the various fields of information which are typically included in each entry of the arbitration queue 200. For example, the queue will include a Transaction field 410, which is the primary contents of the register and holds the transaction awaiting servicing or directory access. In addition to the transaction field, an Operation Ready field 420 may also be included. This field can be as simple as a one bit flag indicating that all conditions precedent to the transaction (e.g., data ready) are satisfied and that the transaction can proceed in turn.

As noted in connection with FIG. 1B, the system memory is generally organized in a number of banks. Therefore, a bank free field 430 can be provided to provide a single bit status indication that the targeted bank of system memory (DRAM) for the corresponding transaction is available. This field can change from cycle to cycle for each entry. Generally, this bit must be set, indicating that the bank is available, before that transaction is ready for arbitration.

A Chain OK field 440 can also be included to provide an indication that other transactions in the arbitration queue targeting the same memory address.

A Read/Write Bit field 450 can also be provided to indicate whether the transaction for an arbitration queue entry is a read operation or a write operation. As noted previously, it is inefficient to turn the direction of the memory bus around from read to write on a frequent basis. The R/W Bit field 450 provides an efficient manner of identifying like transactions for grouping as a common operation type. The R/W field 450 only depends on the contents of the transaction field and, therefore, remains constant for the entry.

The arbitration queue entries may also include a State field 460 to indicate the status of the transaction with respect to the cache contents (e.g., hit, miss, victim). An aspect of the present arbitration scheme is that at the start of the arbitration cycle, the address targeted for each transaction in the arbitration queue is subjected to a comparison with a look-up table representative of the current contents of the cache. The result of this look-up operation is that each entry in the arbitration queue 200 can be designated as one of a hit, miss, or victim state prior to arbitration. A hit state indicates that the targeted DRAM contents are currently in cache. A miss state indicates that the targeted DRAM contents are currently resident in DRAM and that there are no pending write backs to this DRAM location. A victim state indicates that the targeted DRAM contents were in Cache, but a write back is pending in a write back queue (not shown) and neither the data in cache or DRAM is clean until the write back to system memory is complete. Those entries which are in the victim state cannot be serviced, and therefore, will not participate in a current arbitration cycle.

Figure 5:
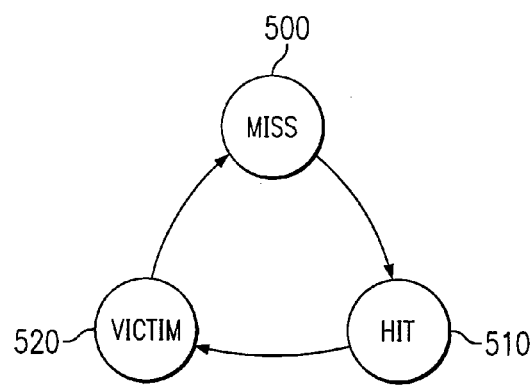
FIG. 5 is a state machine diagram illustrating cyclical status change possibilities for entries in the arbitration queue awaiting successful arbitration.

The State field 460 can change from cycle to cycle depending on the transactions that are serviced during each cycle. FIG. 5 is a diagram illustrating the manner in which the states can change. When the current state of the entry is a hit 510, this entry will either remain a hit if the cache line containing the targeted DRAM contents remains unaltered or can move to the victim state 520 if the cache line has been used by a previous transaction and a write back to the targeted DRAM location is pending. Once in the victim state 520, the entry remains in this state until the cycle after the write back to system memory is complete. When the write back is complete and the DRAM can be accessed to service the transaction, the state advances to the miss state 500. The entry will remain in the miss state 500 until the transaction wins arbitration and is serviced by a DRAM access or a prior transaction results in the targeted DRAM contents being brought into the cache thereby changing the state to the hit state 510.

The present arbitration scheme employs what is called a reverse arbitration process. Rather than servicing transactions merely from oldest to newest, the present arbitration scheme first groups transactions in the arbitration queue by some transaction parameter criteria. Arbitration is then conducted among the groups of transactions and the oldest transaction in the group winning arbitration is then serviced. Any number of transaction parameter criteria can be used to establish transaction groups. However, to minimize latency and maximize system bandwidth, grouping transactions by DRAM Bank, Writes to Bank, and Reads to Bank are particularly useful.

Once the transactions are grouped, arbitration among those groups ready for servicing (e.g., bank is ready, operation is ready, not in victim state) enter arbitration based on a policy associated with the memory interface 130. The arbitration policy will generally favor conducting a number of reads in sequence followed by a number of writes in order to minimize the number of times the memory bus needs to be turned around. FIG. 6 is a table which illustrates an exemplary DRAM direction arbitration policy. In this table, the first three columns, Read 600, Write 610, Urgent Write 620 indicate information derived in a cycle in advance of arbitration about which operations will be desired in the following cycles arbitration. An urgent write can occur, for example, if a number of transactions in the arbitration queue are in the victim state and the pending write backs need to be serviced in order to allow those transactions to become serviceable. The next two columns, Follows Read 630, Follows Write 640, indicate the preceding operation's direction. The next column, Direction Threshold 650, indicates that a predetermined number of the preceding operation have been performed. For example, this flag may be set after a certain number of consecutive reads or a number of consecutive writes have occurred. The final column, Arbitrate For 660, indicates whether the next arbitration will be for a read or a write operation, assuming of course that operations of both types are pending in the arbitration queue or write back queue and are ready for service.

The present memory arbitration features which have been described above are summarized in the flow chart of FIG. 7. When entries are present in the arbitration queue 200, the entries are evaluated to determine their status with respect to the cache, i.e., to determine whether the transaction in that entry will hit a cache entry or not or is a victim (step 710). This status is stored in association with the arbitration queue entries. Also prior to arbitration, the entries in the arbitration queue are grouped by a transaction parameter (step 720). Such parameters may include bank, read to bank, write to bank, read or write, as examples. Once the groups are identified, arbitration takes place among those groups which are ready for arbitration (step 730). From the group that wins arbitration, entries are serviced from oldest to newest (step 740). Using the arbitration queue structure of FIGS. 2 A-C and FIG. 3, this can be accomplished simply by selecting the lowest order entry in the queue 200 in the selected group. After a transaction in the queue is serviced, that queue entry is marked as idle (step 750). In the following cycle, the arbitration queue is "collapsed" by moving all higher order queue entries with respect to an idle entry down in the queue (step 760). This opens the highest order queue positions (the back of the queue) for new entries and maintains the oldest to newest relationship among the entries remaining in the arbitration queue 200. Prior to the next arbitration cycle, the process returns to step 710.

Grouping of entries may be done in several dimensions. The groups may also be overlapping as entries may fall into more than one group. An entry may get serviced first as part of one group than as part of another group. Arbitration may be performed over a large number of groups. The arbitration queue is updated based on status changes of entries with respect to the different groups. Whenever the cache contents are changed, entries in the arbitration queue are most likely affected and their individual hit/miss/victim status and group categorization will need to be updated. the arbitration queue is changed whenever an old entry is serviced and a new entry enters. When a write back is completed, a victim entry needs to be updated to its appropriate classification.

The present systems and methods provide an efficient way of servicing transactions to shared memory. By grouping transactions according to a transaction parameter prior to arbitration in age order, the number of bus turnarounds is minimized without adding to latency. In addition, by evaluating the status of transactions in an arbitration queue with respect to the cache contents and regularly updating this status, DRAM bandwidth is improved as wasted cycles are avoided. By grouping transactions and following an arbitration policy which services entries from an arbitration queue outside of a strict age order, openings in middle of the arbitration queue occur regularly. To insure full queue utilization, a collapsible queue structure and control method are provided.

Thus, it is apparent that there has been provided, in accordance with the present invention, a system and method of managing an arbitration queue having a plurality of queue entries are provided that satisfy the advantages set forth above. Although the present systems and methods have been described in connection with several embodiments thereof, it is understood that numerous changes and modifications can be effected by those skilled in the art and it is intended that the present invention encompasses such changes and modifications as fall within the scope and spirit of the appended claims.

What is claimed is:

1. A method of managing an arbitration queue having a plurality of queue entries comprising:

introducing entries into the queue at a first, highest order queue location;

determining if lower order queue locations are available;

if lower order queue locations are available, moving all higher order queue location contents to an adjacent lower order queue location per cycle until all lower order locations are filled;

evaluating each entry with respect to a cache to determine whether a hit, miss, or victim cache state is applied to each entry;

storing an appropriate cache state in each entry;

associating each entry after placement in the queue to one of a plurality of groups, each of the plurality of groups having a different transaction parameter criteria;

determining which particular one of the plurality of groups to service based on the transaction parameter criteria;

servicing a particular entry in the particular one of the plurality of groups based on servicing criteria and its associated cache state; and moving all higher order queue entries, with respect to the particular entry being serviced, to an adjacent lower order location in the queue.

2. The method of claim 1, further comprising the step of marking a location of a serviced entry as idle.

3. The method of claim 2 wherein the moving step further comprises:

for higher order locations with respect to the idle location, writing the contents of higher order queue locations into adjacent lower order queue locations; and for lower order locations with respect to the idle location, rewriting the current entry into the location.

4. The method of claim 1, further comprising the step of initializing all queue locations to an idle state prior to the step of introducing entries into the queue.

5. The method of claim 1, wherein moving all higher order queue entries further comprises:

providing a plurality of registers corresponding to a number of entries in the queue, the plurality of registers being arranged in a linear array from a highest order register to a lowest order register;

for each register, selectively providing to each register an entry from that register or an entry from a higher order register.

6. The arbitration queue circuit according to claim 5, wherein entries are added to the queue via the highest order register.

7. The arbitration queue circuit according to claim 6, wherein the plurality of registers each have an entry output such that an entry can be removed from any location in the queue.

8. The arbitration queue circuit according to claim 7, wherein the plurality of registers includes 64 registers.

9. A computer system comprising:

a distributed shared memory system;

a plurality of processors generating transactions to said distributed shared memory system; and a memory interface interposed between said distributed shared memory system and said plurality of processors, said memory interface having cache memory, a collapsible arbitration queue having a plurality of entry locations, and a memory arbitration processor for servicing transactions from said plurality of processors, the memory arbitration processor performing a memory arbitration scheme comprising:

placing transactions as entries in the arbitration queue;

evaluating each entry with respect to a cache to determine whether a hit, miss, or victim cache state is applied to each entry;

storing an appropriate cache state in each entry;

associating entries after placement in the arbitration queue to one of a plurality of groups, each of the plurality of groups having a different transaction parameter criteria;

determining which particular one of the plurality of groups to service based on the transaction parameter criteria;

servicing a particular entry of the particular one of the plurality of groups based on its associated cache state;

marking a location of the particular entry in the arbitration queue as idle; and collapsing the arbitration queue by bringing all higher order entries into adjacent lower order locations in the queue to fill the idle location.

10. The computer system according to claim 9, wherein the collapsing operation comprises:

for higher order queue locations with respect to the idle location, writing the contents of higher order queue locations into adjacent lower order queue locations; and for lower order queue locations with respect to the idle location, rewriting the current entry into the location.

11. The computer system according to claim 9, wherein the plurality of entry locations includes a highest order location and a lowest order location, and wherein entries are added to the queue via the highest order location.

12. The computer system of claim 9, wherein the arbitration queue comprises:

a plurality of registers corresponding to the number of entries in the queue;

a plurality of 2:1 multiplexers interposed between said registers such that one multiplexer is interposed between a higher order register and a subsequent register, the output of said higher order register being coupled to a first input of said one multiplexer, the output of said subsequent register being coupled to a second input of said one multiplexer, an output of said one multiplexer being coupled to said subsequent register, and a mux control line being coupled to said one multiplexer to direct the contents of one of said first and second multiplexer inputs to the multiplexer output; whereby the mux control line associated with the higher order register and subsequent register determines whether the subsequent register is refreshed with its current contents or receives the contents of the higher order register.

13. The arbitration queue circuit according to claim 12, wherein the plurality of registers includes a highest order register and a lowest order register, and wherein entries are added to the queue via the highest order register.

14. The arbitration queue circuit according to claim 13, wherein the plurality of registers each have an entry output such that an entry can be removed from any entry in the queue.

15. The arbitration queue circuit according to claim 14, wherein the plurality of registers includes 64 registers.

* * * * *